United States Patent [19]

Wilson, Jr.

[11] 4,419,723
[45] Dec. 6, 1983

[54] REGULATION OF MULTIPLE-OUTPUT DC-DC CONVERTERS

[75] Inventor: Thomas G. Wilson, Jr., Morristown, N.J.

[73] Assignee: Bell Telephone Laboratories, Incorporated, Murray Hill, N.J.

[21] Appl. No.: 316,496

[22] Filed: Oct. 29, 1981

[51] Int. Cl.³ .......................................... H02M 3/335
[52] U.S. Cl. ...................... 363/21; 363/82; 363/90; 323/267
[58] Field of Search .............. 363/20, 21, 75, 82, 363/90-93; 323/251-254, 267

[56] References Cited

U.S. PATENT DOCUMENTS

| 1,865,562 | 7/1932 | Gilson | 363/90 |
|---|---|---|---|
| 4,150,423 | 4/1979 | Boschert | 363/90 X |
| 4,217,632 | 8/1980 | Bardos et al. | 363/91 X |
| 4,302,803 | 11/1981 | Shelly | 363/20 |
| 4,353,113 | 10/1982 | Billings | 363/21 |

OTHER PUBLICATIONS

Matsuo, "Comparison of Multiple-Output DC-DC Converters Using Cross Regulation", IEEE Transactions on Industrial Elec. and Control Instru., vol. IECI--27, No. 3, Aug. '80.
Wilson, Jr., "Cross Regulation in an Energy-Storage DC-DC Converter with Two Regulated Outputs", IEEE 1977 PESC Record, pp. 190-199.
Wilson, Jr., "Cross Regulation in a Two-Output DC-DC Converter with Application to Testing of Energy-Storage Transformers," IEEE 1978 PESC Record, pp. 124-134.
Harada et al., "On the Precise Regulation of Multiple Outputs in a DC-DC Converter with an Energy-Storage Reactor", IEEE 1979 PESC Record, pp. 162-168.

Primary Examiner—Peter S. Wong
Attorney, Agent, or Firm—R. O. Nimtz; A. G. Steinmetz

[57] ABSTRACT

A multiple-output DC-DC converter has an electronically controllable reactor (64,66) connected in series with each output circuit. In response to variations in voltage of the output circuits (80,82), control signals are fed back to vary the permeance of the electronically controllable reactor (64,66) in each output circuit. The voltage in any output circuit is thereby made independent of input voltage variations and load fluctuations in any other output circuit.

8 Claims, 6 Drawing Figures

REGULATION OF MULTIPLE-OUTPUT DC-DC CONVERTERS

TECHNICAL FIELD

This invention relates to multiple-output DC-DC converters and, in particular, to the regulation of multiple-output DC-DC converters.

BACKGROUND OF THE INVENTION

In a DC-DC converter having a plurality of voltage outputs, one of the voltage outputs may be directly sensed and fed back to a controller for varying the duty cycle of a switching transistor connected to the converter input. The regulation of the remaining outputs is achieved by using the magnetic coupling between the secondary output circuits. Such a method of controlling the output voltages is referred to as cross regulation. Because the magnetic coupling between secondary windings is never perfect, however, as the load connected to one of the output circuits fluctuates, the voltages of the other output circuits may also fluctuate. It is desirable to be able to regulate independently each of the voltage outputs regardless of load variations.

SUMMARY OF THE INVENTION

In accordance with the illustrative embodiment of the present invention, both method and apparatus are disclosed for regulating the voltage in each output circuit of a multiple-output DC-DC converter independently of variations in the load connected to each other output circuit. This voltage regulation is obtained by varying the inductance in each output circuit in response to load fluctuations.

More particularly, a electronically controllable reactor is connected in series with each output circuit, namely, the secondary-winding circuit. According to one embodiment, the load voltage or a proportion thereof in one of the output circuits is compared with a reference voltage to develop an error signal. In response to the error signal, a control current in each output circuit is adjusted and fed back to control the permeance of the electronically controllable reactor.

According to another embodiment, the output current in one of the output circuits is fed back to control the permeance of the electronically controllable reactor connected thereto. In each of the remaining output circuits, the output voltage is compared with a reference voltage to produce an error signal. In response to the error signal, a control current is adjusted and fed back to control the permeance of the electronically controllable reactor in that output circuit.

In each of the aforesaid embodiments, input voltage variations and load fluctuations across any secondary circuit are prevented from affecting the load voltage across any of the remaining secondary circuits of a multiple-output DC-DC converter.

One advantage of the present invention is the highly efficient method of regulating multiple-output DC-DC converters by using low loss components, namely, electronically controllable reactors, thereby minimizing the loss of energy.

Another advantage is the method of generating an arbitrarily precise output voltage in any output of a multiple-output DC-DC converter regardless of load fluctuations in any of the remaining outputs thereof.

DETAILED DESCRIPTION

Figure 1:
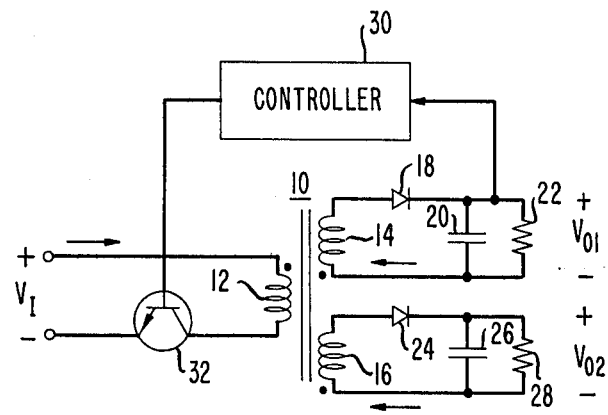
FIG. 1 shows the prior art method of cross regulation in a multiple-output DC-DC converter.

Referring to FIG. 1, there is shown a prior art energy-storage transformer 10 comprising a primary winding 12 and a plurality of secondary windings 14,16. The pulsating current in secondary winding 14 is rectified to direct current (d.c.) by diode 18 and capacitor 20. The rectified current is delivered to a load 22, shown connected across the capacitor 20. Likewise, pulsating current in secondary winding 16 is rectified by diode 24 and capacitor 26 and d.c. is delivered to load 28. In response to the sensed d.c. output voltage $V_{01}$ delivered to load 22, controller 30 varies the duty cycle of switching transistor 32, shown connected in series with the primary winding 12.

Transformer 10 is designed to deliver energy to loads 22 and 28 within a specified range. As the current drawn by load 22 varies within its specified range, the current delivered to load 28 varies appreciably. It is the purpose of this invention to deliver load current to load 28 within a specified range regardless of load variations in load 22.

Figure 2:
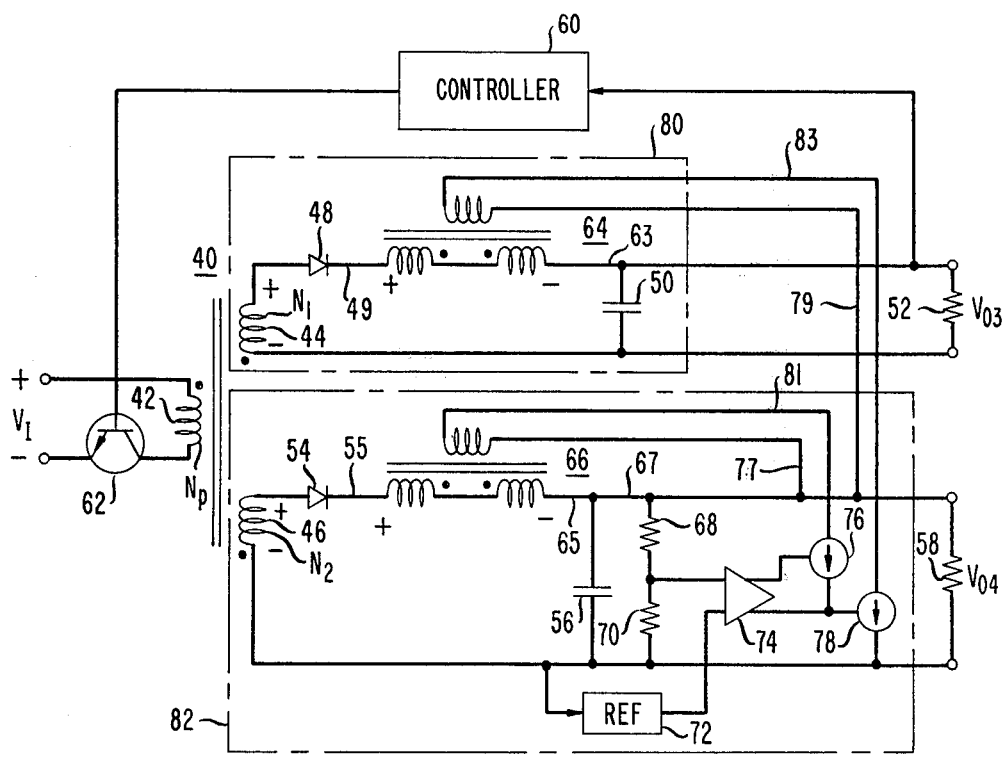
FIG. 2 shows one embodiment of the present invention for regulation of a multiple-output DC-DC converter.

Referring to FIG. 2, there is shown a transformer 40 having a primary winding 42 and a plurality of secondary windings 44,46. Diode 48 and capacitor 50 provide d.c. to a load 52 shown connected across the capacitor 50. Likewise, diode 54 and capacitor 56 provide d.c. to a load 58. The output voltage, $V_{03}$, across load 52 is sensed by controller 60. Controller 60 adjusts the duty cycle of the switching transistor 62, connected in series with the primary winding 42.

There is shown connected in series with the secondary winding 44, an electronically controllable reactor 64. Likewise, secondary winding 46 is connected in series with electronically controllable reactor 66. The output voltage, $V_{04}$, across load 58, is sensed through resistors 68 and 70. A potential drop, proportional to the output voltage, is developed across the voltage divider comprising resistors 68 and 70. The sensed voltage is compared with a reference voltage from reference 72 by comparator 74 to generate an error signal. This error signal is used for controlling the current sources 76 and 78. Current sources 76 and 78, in turn, adjust the amount of the control current flowing through leads 77 and 79 to electronically controllable reactors 66 and 64, respectively.

When the load current to load 58 drops, the comparator 74 operates to change the settings of the current sources 76 and 78, thereby regulating the amount of control current flowing through leads 77 and 79 to the electronically controllable reactors 66 and 64, respectively. The control current to the electronically controllable reactors 66 and 64 changes the permeance thereof. That is, the inductance of the load windings of each electronically controllable reactor of each output circuit 80 and 82 corresponding to the secondary windings 44 and 46, respectively, will be adjusted so that the load voltages will be regulated to specified values.

Figure 3:
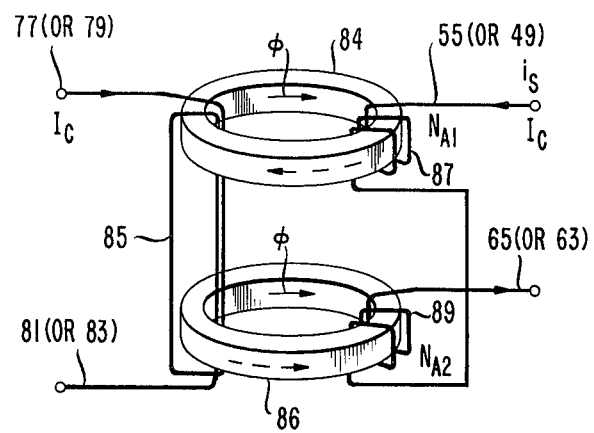
FIG. 3 shows details of an embodiment of the electronically controllable reactor shown in FIG. 2.

Referring more particularly to FIG. 3, there is shown one embodiment of electronically controllable reactor 64 or 66. The leads in FIG. 3 bear the same indicia corresponding to those of FIG. 2. Each of the electronically controllable reactors 64,66 comprise two toroidal, saturable cores 84 and 86, a control winding 85 and load windings 87 and 89. The control winding 85 bears the d.c. feedback or control current from current source 76 or 78 in output circuit 82 or 80. When the number of turns of winding 85 is made large, the amount of control current necessary to saturate the cores 84 and 86 will be decreased. Thus, the power required to control the load voltages will be quite small. Consequently, the efficiency of the system will be increased.

The secondary windings 87 and 89 each have equal number of turns. Furthermore, windings 87 and 89 are connected in such a way that the a.c. flowing therethrough induce magnetic flux in cores 84 and 86, respectively, flowing in opposite directions, shown by broken directional lines. Because of these two conditions, no net a.c. flux will link the control winding 85 and no net a.c. voltage will be induced across winding 85.

The magnetic flux $\phi$ (shown by solid directional lines) is induced in cores 84 and 86 by the control current in winding 85.

Figure 4:
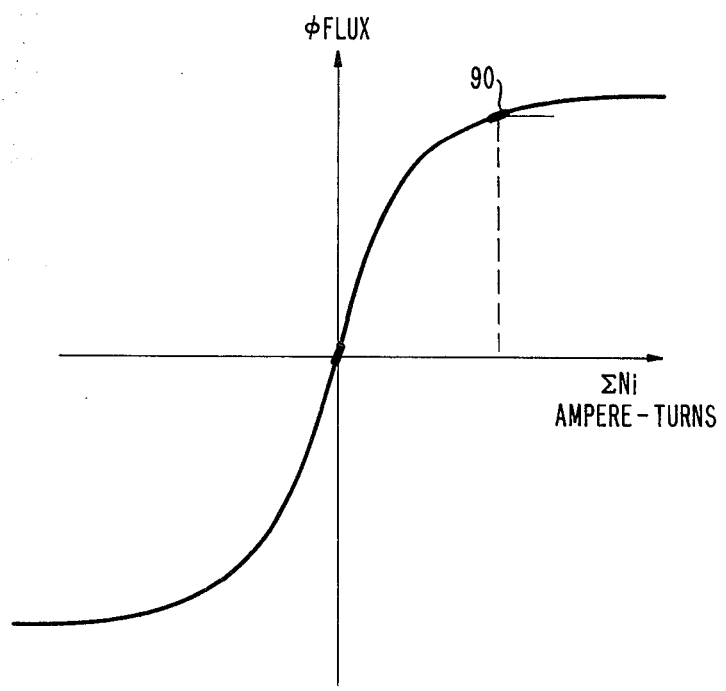
FIG. 4 shows a characteristic $\phi$ vs. $\Sigma Ni$ curve for the electronically controllable reactor in FIG. 3.

Referring to FIG. 4 there is shown by the solid curve a typical characteristic $\phi$ vs. $\Sigma Ni$ curve (i.e., flux versus ampere-turns) for each core of the electronically controllable reactors 64,66. The slope of the $\phi$ vs. $\Sigma Ni$ curve at any point thereon is a measure of the permeance of the cores 84,86. As stated hereinabove, the d.c. level of magnetic flux $\phi$ induced in core 84 is related to the d.c. control current flowing in winding 85. This relationship is shown by the $\phi$ vs. $\Sigma Ni$ curve of FIG. 4. For small a.c. excursions about this d.c. operating point, the control current determines the permeance. This phenomenon can be better understood by referring to point 90 on the $\phi$ vs. $\Sigma Ni$ curve. Small increases and decreases of the aforesaid magnetic flux occur simultaneously in small excursions about point 90 along the tangent to the $\phi$ vs. $\Sigma Ni$ curve thereat. It is well-known that this tangent is the slope of the curve at point 90, thereby indicating the permeance.

Figure 5:
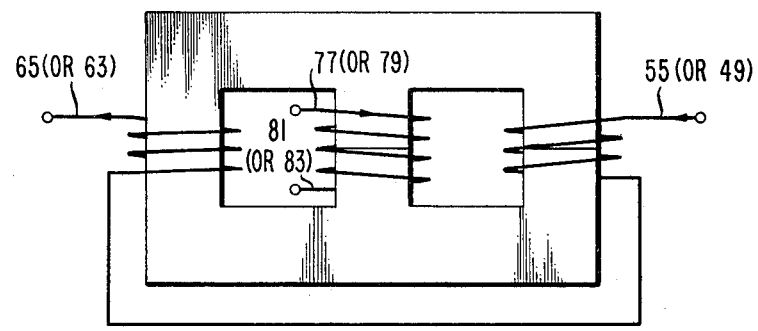
FIG. 5 shows another embodiment of the electronically controllable reactor shown in FIG. 3.

Referring to FIG. 5, there is shown an alternative embodiment to the electronically controllable reactor shown earlier in FIG. 3. The windings on the reactor in FIG. 5 bear the same indicia as those in FIG. 3. Furthermore, the embodiment shown in FIG. 5 operates in substantially the same manner as that shown in FIG. 3.

Figure 6:
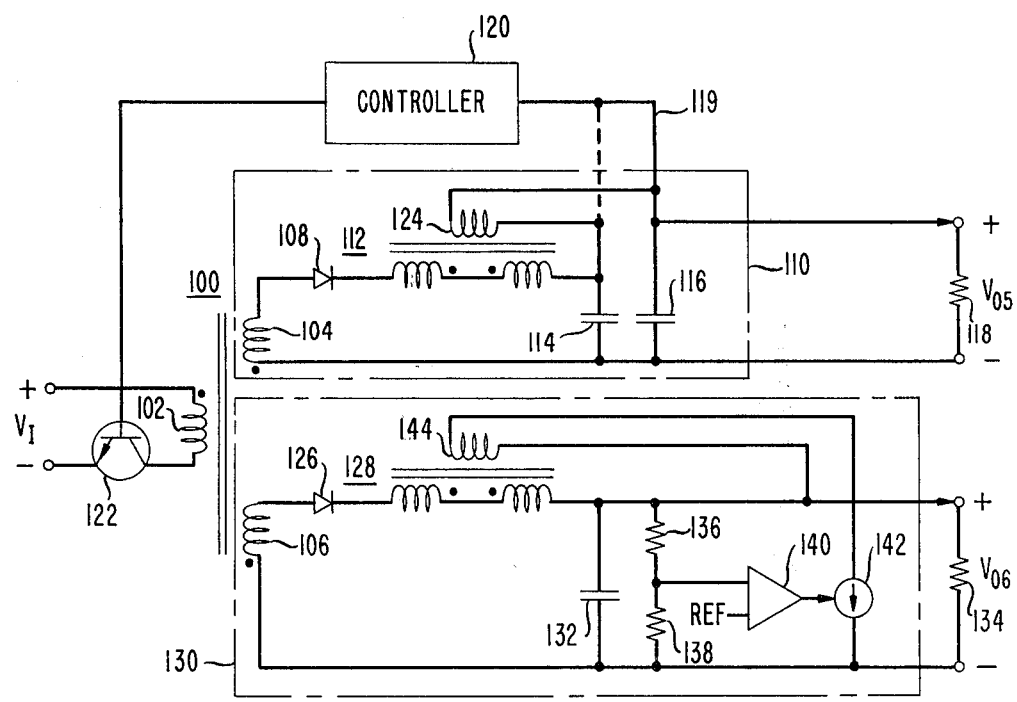
FIG. 6 shows another embodiment of the present invention for regulation of a multiple-output DC-DC converter.

Referring to FIG. 6, there is shown another embodiment of the present invention. Transformer 100 has primary winding 102 and secondary windings 104,106. Output circuit 110 has connected to secondary winding 104, a diode 108, electronically controllable reactor 112, capacitors 114,116 and a load 118. The output voltage of output circuit 110 is sensed by lead 119 and conveyed to controller 120 for varying the duty cycle of switching transistor 122. The load current is fed back to control winding 124 to vary the permeance of electronically controllable reactor 112. Capacitor 116 insures that any alternating currents induced in control winding 124 will be filtered.

Likewise, output circuit 130 comprises diode 126, electronically controllable reactor 128, capacitor 132 and load 134. The output voltage is sensed by voltage divider 136,138 and compared with a reference voltage at comparator 140 to produce an error signal. This error signal is used to adjust the setting of current source 142, thereby regulating the amount of control current fed back to control winding 144.

When there is a fluctuation in load 118, because of the magnetic coupling between secondary windings 104 and 106, there will be a change in the load current delivered to load 134. This change will be detected by comparator 140. In response thereto, the current source 142 will be adjusted to regulate the feedback current to control winding 144 for changing the permeance of electronically controllable reactor 128. In turn, the load current for load 134 flowing through the load windings of electronically controllable reactor 128 will be adjusted thereby compensating for fluctuations in load 118.

What is claimed is:
1. A DC-to-DC converter comprising
an input circuit for accepting a DC voltage source and including a power switch and a primary winding of a power transformer
the power transformer including at least first and second secondary windings
first and second output circuits coupled to the first and second secondary windings and including first and second inductors with adjustable permeance, respectively,
means for regulating a voltage output of the first output circuit by controlling an on-off cycle of the power switch, and
means response to a voltage output of the second output circuit to generate a bias current operative for adjusting a permeance of at least the second inductor to a value remaining substantially constant during any one on-off cycle of operation of the power switch wherein the second inductor of the second output circuit as so adjusted is operative to counteract a drift in magnitude of an output voltage.

2. A DC-to-DC converter as defined in claim 1 wherein the means responsive to a voltage output of the second output circuit comprises means for comparing an output voltage of the second output circuit with a reference voltage and generating an error voltage, and
means for supplying the bias current to the second inductor in response to the error voltage in order to adjust a permeance of the second inductor.

3. A DC-to-DC converter as defined in claim 2 and further including second means for supplying an adjustable bias current to the first inductor in response to the error voltage in order to adjust a permeance of the first inductor.

4. A DC-to-DC converter as defined in claim 2 and further including feedback means for supplying a feedback current from the second output circuit to the first inductor in order to adjust its permeance.

5. A DC-to-DC converter having multiple outputs comprising
a power transformer including a primary winding and first and second secondary windings
input means for accepting a source of DC voltage
a power switch coupling the input means to the primary winding a first output circuit connected to the first secondary winding and including a first inductive device with adjustable permeance, voltage regulation means coupled to sense a voltage of the first output circuit and to control a duty cycle of the power switch a second output circuit connected to the second secondary winding and including a second inductive device with adjustable permeance means for adjusting permeance to some substantially constant value in which only small AC excursions about a DC operating point in a $\phi$ vs. $\Sigma Ni$ curve of the first and second inductive devices occur within a single cycle of operation of the power switch including first adjustment means for adjusting a permeance of the first inductive device and second adjustment means for adjusting a permeance of the second inductive device, the second adjustment means comprising means for sensing a voltage in the second output circuit and comparing it to a reference voltage in order to generate an error voltage, a variable current source responsive to the error voltage and coupled to apply a bias current to the second inductive device in order to adjust its permeance.

6. A DC-to-DC converter as defined in claim 5 wherein the second adjustment means further includes a second variable current source responsive to the error voltage and coupled to apply a bias current to the first inductive device in order to adjust its permeance.

7. A DC-to-DC converter as defined in claim 5 wherein the first output circuit includes means for feedback of an output current as a bias current to the first inductive device in order to adjust its permeance.

8. A DC-to-DC converter as defined in claim 5 wherein the first and second inductive device each comprises first and second load windings coupled in series and a control winding to accept a bias current, the first and second load windings being oriented so that their respective generated fluxes cancel whereby a flux level in the inductor is due only to bias current in the control winding.

* * * * *